United States Patent
Cristea et al.

(10) Patent No.: US 11,219,234 B2
(45) Date of Patent: Jan. 11, 2022

(54) METHODS FOR MAKING GRILL-TYPE SMOKED FOOD INGREDIENTS

(71) Applicant: PureSmoke Limited, Arundel (GB)

(72) Inventors: Elena Cristea, Bognor Regis (GB); Huw David Griffiths, Arundel (GB)

(73) Assignee: PureSmoke Limited, Arundel (GB)

( * ) Notice: Subject to any disclaimer, the term of this patent is extended or adjusted under 35 U.S.C. 154(b) by 108 days.

(21) Appl. No.: 16/273,258

(22) Filed: Feb. 12, 2019

(65) Prior Publication Data
US 2019/0246672 A1   Aug. 15, 2019

(30) Foreign Application Priority Data

Feb. 13, 2018   (EP) ...................................... 18156552
Nov. 5, 2018   (GB) ...................................... 1818005

(51) Int. Cl.
*A23L 27/27* (2016.01)
*A23B 4/048* (2006.01)

(52) U.S. Cl.
CPC .............. *A23L 27/27* (2016.08); *A23B 4/048* (2013.01); *A23V 2002/00* (2013.01)

(58) Field of Classification Search
CPC ......... A23B 7/157; A23B 7/158; A23B 7/154; A23V 2002/00; A23L 3/3499; A23L 3/358; A23L 3/3589; A23N 12/02
See application file for complete search history.

(56) References Cited

U.S. PATENT DOCUMENTS

| | | |
|---|---|---|
| 3,152,914 A | 10/1964 | Taylor |
| 3,480,446 A | 11/1969 | Hollenbeck |
| 4,876,108 A | 10/1989 | Underwood et al. |
| 4,994,297 A | 2/1991 | Underwood et al. |
| 5,952,029 A | 9/1999 | Freel |

FOREIGN PATENT DOCUMENTS

| | | | |
|---|---|---|---|
| EP | 0867122 A1 | 9/1998 | |
| EP | 3027034 B1 * | 10/2017 | ............. A23L 27/27 |
| GB | 2182536 | 5/1987 | |
| JP | 2006/230372 | 9/2006 | |

OTHER PUBLICATIONS

"Beginner's guide to smoking—Weber". Available online at www.Contact-amea.weber.com) (Year: 2001).*
"Drippings make smoke flavor?" Available online at https://www.bbq-brethren.com/forum/archive/index.php/t-224904.html (Year: 2016).*
Prosciutto.it "Traditional smoking and preservation of meat", retrieved from http://blog.prosciutto.it/en/2012/05/25/traditional-smoking-and-preservation-of-meat/, 1 page.

* cited by examiner

*Primary Examiner* — Erik Kashnikow
*Assistant Examiner* — Assaf Zilbering
(74) *Attorney, Agent, or Firm* — Casimir Jones, S.C.; Tanya A. Arenson

(57) ABSTRACT

A method for making a liquid (e.g. water or oil)-based food ingredient, having grill flavour properties, comprises:

combusting in the presence of oxygen, an intimate mixture of (i) 2-15 parts by weight smoke source and (ii) 1 part by weight flavour source, to generate smoke; and combining the smoke with a liquid carrier, yielding the food ingredient, wherein the flavour source comprises a lipid having an oleic acid content (whether free or esterified) of 20% or higher.

20 Claims, 2 Drawing Sheets

METHODS FOR MAKING GRILL-TYPE SMOKED FOOD INGREDIENTS

CROSS-REFERENCE TO RELATED APPLICATIONS

The present application claims priority to EP Patent Application No. EP18156552.4, filed Feb. 13, 2018, and claims priority to GB Patent Application No. 1818005.9, filed Nov. 5, 2018, the contents of which are incorporated by reference in their entireties.

INTRODUCTION

The present invention relates to methods for making grill-type smoked food ingredients, and in particular to methods of making a replacement for existing grill flavourings used by the food industry.

BACKGROUND

In general, flavourings are substances used to impart taste and/or smell to food. Flavourings have a long history of safe use in a wide variety of foods, from confectionery and soft drinks to cereals, cakes and yoghurts. They are used in comparatively small amounts so that consumer exposure is relatively low.

Flavourings and food ingredients that mimic or evoke grilled foods are popular in the food industry, for inclusion in a wide range of products, and are referred to generally as "grill flavour" or "grill-type flavour" or similar.

Grill-type flavours are known from pyrolysis reactions disclosed in U.S. Pat. Nos. 4,876,108 and 4,994,297 (to Underwood). The food flavouring disclosed in U.S. Pat. No. 4,994,297 comprises liquid smoke, obtained from the pyrolysis of wood or cellulose feed stocks, using the method disclosed in U.S. Pat. No. 4,876,108, to produce a flavouring that is related to but quite distinct from the grill-type food ingredients described herein.

A more recent, known grill flavouring is described in U.S. Pat. No. 5,952,029 and EP0867122, obtained by heating a spray or atomized droplets of a saturated or partially saturated vegetable oil to a temperature of at least 480° C. in an oxygen starved atmosphere in a fast pyrolysis reactor. Specific commercial grill flavours include Grill Flavor® L2558, manufactured by Kraft Food Ingredients Corporation of Memphis, Tenn., USA and Grillin' 5078 available from Red Arrow International LLC, Manitowoc, Wis., USA.

In GB 2182536, portions of meat were subjected to smoke formed by oxidizing fat at a temperature below the flash point of that fat; as such, no flaming of the fat occurred. The fat was dripped onto a heated metal plate, in order to heat the fat to the desired temperature. In JP 2006/230372, fats and oils were dropped/sprayed onto burning charcoal, in order to produce a smoke that could be used to provide a charcoal-grilled flavour to food materials. It is further known from U.S. Pat. Nos. 3,480,446 and 3,152,914 to use an oil as a smoke carrier.

European Union (EU) legislation defines different types of flavourings, such as natural flavourings and smoke flavourings, and in Europe the manufacture and use of flavourings is governed e.g. by Regulation (EC) No.s 1331/2008 and 1334/2008 on flavourings and certain food ingredients with flavouring properties for use in and on foods. Known commercial grill flavours made by pyrolysis methods are believed to fall outside this legislation, i.e. are not regarded as safe and/or are not regarded as natural food products. Specifically, the safety of Grillin' 5078, mentioned above, cannot be established.

Deep frying fats have also been identified as sources of toxic products as e.g. polycyclic aromatic hydrocarbons (PAHs) may be formed during pyrolysis of fats at temperatures above 400° C. Consequently, deep-frying fats subjected to repeated use have been identified as providing the conditions most conducive to the generation of high levels of toxic products (see: International Food Safety Handbook: Science, International Regulation, Control, Jul. 16, 1999 by CRC Press, ISBN 9780824793548—CAT #DK5118).

AIM OF THE INVENTION

An aim of the invention is to provide alternative products that mimic or evoke grill flavour and can be used as such in foods, preferably complying with the relevant food safety legislation. A further aim is to ameliorate and/or overcome difficulties identified in known grill flavourings and similar ingredients. A further aim of preferred embodiments is to provide an improved grill-type food ingredient with grill flavour characteristics.

SUMMARY OF THE INVENTION

The invention provides methods of making flavoured foods and food ingredients, by combustion of lipid and capture of volatiles from combusted lipid.

Accordingly, the invention provides a method of flavouring a carrier to make a food ingredient, comprising:
 combusting a mixture of (i) smoke source and (ii) flavour source, to generate smoke; and
 combining the smoke with the carrier, yielding the food ingredient, wherein the flavour source comprises a lipid.

The methods impart flavour to the carrier, and preferred carriers are oils having a high saturated fat content and preferred flavour sources are lipids with high oleic acid content, this combination giving a grill flavour.

As described in more detail below, the methods suitably comprise:
 preparing a mixture of the smoke source and the flavour source;
 combusting the mixture to generate smoke; and
 combining the smoke with the carrier, yielding the food ingredient.

DETAILS OF THE INVENTION

The methods yield food ingredients that can be used to impart a grill character to foods.

Smoke from combustion material (fuel) and combusted flavour source is captured in the carrier, yielding the grill-type food ingredient and leaving behind non-volatile components that would otherwise contaminate the food ingredient. Specific examples recited below set out particular food ingredients that have been obtained from sunflower oil and lard.

Combustion Material

In general, the fuel (also referred to as combustion material) for the source of the smoke is not limited, provided that the smoke is regarded as useable for smoking food for human consumption, and hence for making food ingredients, e.g. oil- or water-based. Smoke is typically generated from a combustion material or fuel provided in a form that is relatively dry and can be combusted to generate heat to combust the flavour source and to yield smoke to generate contributing smoke flavour. Fuel is preferably in particulate form, usually finely divided e.g. as powders or dusts, and this assists in providing intimately combined, homogenous mixtures of different materials as such particulates are easily mixed and as flavour source is easily mixed into the particulates. Powders are suitably 5 mm in diameter or less and dusts generally have a diameter of 1 mm or less (measured by laser diffraction). Preferred materials for generating smoke and/or inclusion in the smoke source are: wood chips, wood dust, wood shavings, wood briquettes, logs, smoke-free solid fuel, charcoal and charcoal briquettes. To promote and/or facilitate homogenous mixing of smoke source and flavour source the smoke source if composed of larger pieces can be broken into smaller pieces, especially into particulates as described above. Alternatively, or additionally, an intimate/homogenous mixture can be provided by soaking flavour source into smoke source pieces. In generating smoke for the invention, we have successfully used oak, hickory, cherry, apple, beech wood, maple, manuka, pine, spruce, whiskey oak and woodland sage. Other suitable woods and other smoke sources include alder, barley, malted barley, black walnut, red oak, honey oak, walnut, cedar, chestnut, corn cobb, maple, mesquite, mulberry, orange, pear, pecan, plum, and sandalwood and also mixtures thereof. Other sources of smoke apart from wood include herbs, tea, botanicals and botanical oils (optionally to provide additional flavour in combination with one or more other principal flavour/smoke sources).

It is desirable to provide the grill-type flavour as a main flavour and even as substantially the only flavour. Preferably, the combustion material includes some material that generates heat for burning of the flavour source with only a little smoke production, meaning only a little production of smoke-flavoured volatiles, allowing the grill flavour to dominate. Preferably the combustion material comprises a relative smoke-free fuel, preferably charcoal or similar. This can be used alone or blended in combination with relatively smoke-generating material. Varying the blend varies the degree of smokey flavour in the end product. By using the term 'relative', it should be understood that relatively smoke-free fuels such as charcoal may themselves smoke to a low extent but significantly less than relative smoke-generating fuels such as wood that can generate a characteristic smokey flavour.

Mixtures of Smoke-Free and Smoke-Generating Fuel

In preferred methods of the invention, illustrated in examples below, a mixture of smoke-free (or relatively smoke-free) and smoke-generating fuels is used, preferably in a ratio of from 20:1 to 1:20, more preferably 10:1 to 1:10 and more preferably 3:1 to 1:3. In specific examples a ratio of approximately 1:1 was used, referring to these 2 constituents only. Other constituents such as filters may be present, and the flavour source is also present.

The relatively smoke-free fuel preferably is or comprises charcoal.

The smoke-generating fuel preferably is or comprises wood.

Filter Material

Preferably the methods comprise filtering the smoke to reduce its PAH content, e.g. treating the smoke to selectively remove therefrom one or more PAHs that contain 4 or more benzene rings. In further preferred embodiments, the subject of examples below, filtration is applied to selectively remove benzo(a)pyrene, benz(a)anthracene, chrysene and/or dibenz (a,h)anthracene from the smoke.

Smoke can be filtered by generating smoke in the presence of filter material and/or passing smoke through a filter. Preferably, the smoke source comprises a filter and hence fuel/combustion material and filter material are both present in the chamber that provides the smoke source, and fuel/combustion material is combusted in the presence of the filter, being intimately mixed therewith. This approach was used in the examples below. Substantially homogenous mixtures are preferred where more than one component is present.

The filter may be a natural or synthetic porous mineral. In particular, the mineral may be a zeolite. In a particularly preferred embodiment, the zeolite is clinoptilolite. Typically, for a filter separate from the fuel, filter material (in the form of powder or granules) is packed into and retained in or on a filter holder such as a box or column.

In preparation of filters for use in the invention, the filter material may also be combined with other components, e.g. with support material, and/or with sand or iron salts.

Suitable filters remove from the smoke PAHs containing 4, 5 or more benzene rings, thus removing PAHs such as pyrene, benz(a)anthracene, naphthacene, chrysene, benzo(a) pyrene and dibenz(a,h)anthracene. Other suitable filters also remove PAHs containing 3 or more rings, thus additionally removing PAHs such as anthracene, phenanthrene and 2-methyl anthracene.

Still further, suitable filters may be used to also remove PAHs having just 2 rings. As will be appreciated, PAH size is related to but not directly proportional to the number of rings and a size exclusion filter that removes PAHs having 2 rings will also remove larger PAHs e.g. having 3, 4, 5 or more rings.

Pre-treatment of the filter may be employed to modify and preferably improve its properties and/or activity. The filter can be pre-treated by soaking in mild acid, preferably containing ammonium ions, suitably ammonium chloride. For example, the filter may be soaked in approximately 1 molar ammonium chloride, for instance for approximately 24 hours prior to use. Generally, the filter is dried prior to use.

A separate, also optional, though related step is to treat the filter by ion exchange so as to exchange sodium and/or calcium ions, e.g. in the zeolite, preferably clinoptilolite, with lithium, potassium or preferably ammonium ions. The filter can be treated with KOH, KCl, LiOH, LiCl or ammonium ions for this purpose, e.g. using ammonium chloride as described above and in more detail in specific embodiments below. Again, the filter material is generally dried prior to use.

A further separate, also optional but preferred, step is to heat the zeolite filters prior to or during use. Heat treatment assists filter performance, it is believed by opening channels in the filter material e.g. by removing water, and can be for an hour or more, a few hours or up to about 12 hours. Preferred embodiments of the invention comprises pre-treating the filter by heating or baking at 150° C. or higher, preferably 200° C. or higher, typically at around 270° C. or more. Baking/heating activates the filter in that it is better able to remove PAHs from smoke. The filter may also be baked/heated between batches of smoke treatment to re-activate the filter.

Suitably, the methods comprise filtering the smoke selectively to remove one or more PAHs that contain 3 or more benzene rings. Preferably, the methods comprise filtering the smoke selectively to remove one or more PAHs that contain 4 or more benzene rings. Typically, the method removes a plurality of the PAH compounds and in specific embodiments of the invention removal of substantially all of a large number of PAHs has been achieved. In embodiments of the invention, the one or more PAHs are selected from benzo(a)pyrene, benz(a)anthracene, benzo(b)fluoranthene, benzo(j)fluoranthene, benzo(k)fluoranthene, benzo(g,h,i)perylene, chrysene, cyclopenta(c,d)pyrene, dibenz(a,h)anthracene, dibenzo(a,e)pyrene, dibenzo(a,h)pyrene, dibenzo(a,i)pyrene, dibenzo(a,l)pyrene, indeno(1,2,3-cd)pyrene, benzo-(c)-fluorene and 5-methylchrysene. The method removes significant quantities of one or more of the PAHs, and preferably removes significant quantities of a plurality of the PAHs. In specific examples, described below, particular PAHs known to be carcinogenic are substantially removed but the smokey flavour is substantially unimpaired. Methods of the invention may thus comprise selectively removing the PAHs benzo(a)pyrene, benz(a)anthracene, dibenz(a,h)anthracene, two of those PAHs or all three. In particularly preferred embodiments, the method reduces the level of at least benzo(a)pyrene and/or benz(a)anthracene.

Presence of Filter Material

In preferred methods, therefore, the smoke source (or combustion material) comprises a filter as described above. When present the filter is generally present in an amount of from 1 to 50% by weight of the total of flavour source plus smoke source (hence, for 9000 g wood dust plus charcoal dust and 180 g sunflower oil the filter is added at from 92 g to 4600 g). The filter is preferably present in an amount of from 2 to 30%, more preferably 2 to 20%, more preferably 3 to 15% by weight of that total.

Flavour Source

To generate grill-type flavour in the food ingredient, the flavour source used is or comprises a lipid and preferably one that comprises oleic acid, meaning either as free fatty acid or esterified (e.g. in fat). Preferably, the lipid is selected from animal fats and oils, again preferably ones known to have oleic acid contents and especially relatively high oleic acid content, meaning 10% or above, more preferably 20% or above (%=proportion of total fatty acid esters; Orsavova et al, Int. J. Mol. Sci 2015, 16, 12871-12809).

Preferred animal fats are selected from pig fat (lard), beef fat (tallow), mutton fat (tallow), bacon dripping, chicken fat, turkey fat and mixtures thereof.

Preferred oils are high oleic acid content oils (as defined below). More generally, preferred oils are selected from olive oil, pecan oil, canola oil, peanut oil, macadamia oil, sunflower oil, grape seed oil, sea buckthorn oil, sesame oil, poppyseed oil, safflower oil, pumpkin seed oil, rice bran oil, almond oil, rapeseed oil and mixtures thereof.

Other lipids may also be used to generate other characteristic smoked food ingredients such as roast, charred, toasted and burnt, and so oleic acid content may not be of such importance for variant flavours made according to the invention Carrier Methods of the invention are for making food ingredients. The carrier can hence be any suitable for the food industry. Solid carrier can be used, preferably in finely granulated or powder form, and also preferably in dry form. Materials suitable for the food industry include saccharides, polysaccharides and starches, with maltodextrin as an example. Other powdered, finely divided food additives/ingredients may be used, e.g. silicas. Especially suitable are also salt, sugar and/or spices. The carrier is suitably a liquid carrier. Oil- and water-based carriers are preferred, depending upon the ultimate use for the food ingredients. Water is a preferred carrier. Oils and mixtures of oils are also preferred.

Long shelf life is desirable in food and food ingredients; to that end dry solid carriers in powder form are preferred and also stable oils are preferred, and usually these latter are relatively low in polyunsaturated and monounsaturated fats/fatty acids and high in saturated fats/fatty acids. Preferably the oils have a low level of oxidation.

Suitable carrier oils for the present invention include high stability vegetable oils, that is to say, saturated, or partially saturated vegetable oils. Preferred oils include saturated or partially saturated palm oil, soya oil, peanut oil, canola, corn oil, coconut oil, animal fats, beef tallow and butter.

More specifically, the carrier is preferably an oil having a high saturated fat content: high saturated fatty acid levels give improved stability. Known saturated fat levels are approximately: coconut oil: 86-92% saturated; butter: 50-68% saturated; lard—39% saturated; olive oil: 14% saturated; and sesame oil: 14% saturated. High levels are 10% and above, preferably 30% and above. All these oils can also be used as the flavour source or as a part of the flavour source. Also specifically, the quality of sunflower oil may be assessed on the basis of the ratio oleic:linoleic acid. Commonly, the fatty acid composition in sunflower oil is: 55-65% of linoleic acid, 20-30% of oleic acid (a high level being 20% and above), and the remainder including other fatty acids, primarily palmitic and stearic. Sunflower oil is regarded as a stable oil, and most versions are useful in the invention. Particular versions used in the invention preferably contain even higher oleic acid levels, e.g. at least 50% oleic acid, more preferably at least 60% and more preferably still at least 70%. A known high oleic acid sunflower oil has about 82% oleic acid.

Oils with lower levels of saturates and which are generally less useful as stable carrier oils, but which may be acceptable if stability is less of a required feature, include avocado, fish, flax and [some] nut (including peanut) oils.

As particular examples of preferred stable carrier oils are included: oils with a high oleic acid content, such as sunflower oil, lard, tallow and olive oil, and oils with a saturated fatty acid content of 20% and higher, more preferably 35% and higher.

Combination of the smoke and the carrier is conventional and can be carried out using known smoking equipment. Generally, for combination of smoke into oil the process is carried out gently so as not to adversely affect the oil e.g. by oxidation. More aggressive agitation is possible when smoking into water-based carriers. Powders can be combined with smoke on trays passively as is known in this field.

Mixture of Flavour Source and Smoke Source

In examples of operating the invention, the flavour source is intimately mixed with the smoke source, so as to evenly distribute the (frequently liquid) flavour source throughout. The smoke source is typically a mixture of charcoal and wood in finely divided, particulate form but may also be just one thereof. It is preferred that the flavour source and fuel are made into a homogenous mixture prior to combustion. The flavour source and smoke source (combustion material) may be provided as a dispersion, e.g. a coarse dispersion; the flavour source is dispersed into the smoke source and the dispersion is then combusted. Optionally, a filter material is also included in the mixture prior to combustion; in such cases, it is preferred that the filter material is also intimately mixed, so as to form a consistently uniform mixture of flavour source, smoke source and filter material (if present). In cases where a relative smoke-free fuel is used in addition to a relative smoke-generating fuel, it is preferred that all solid components in the mixture are powdered and mixed intimately with each other.

In the combusting mixture, both flavour source and smoke source (fuel, combustion material) are included. There is enough fuel for the temperature to rise such that the flavour, e.g. oleic acid-containing lipid, is combusted, releasing volatiles that are captured in the carrier. We have found good results at relatively small scale using first approximately a 1:50 and then approximately a 1:20 weight ratio of flavour to fuel. This ratio can be varied provided there is heat sufficient to burn the flavour and the mixture is otherwise suitable to combust in a controlled matter in a smoking chamber/furnace e.g. as described in the examples below. A probe is recommended to monitor the temperature so that by agitation and/or varying the air input the combustion proceeds within desired parameters. A ratio of flavour:fuel from about 1:5 upwards and/or up to about 1:200 can be tolerated, preferably 1:10 or more, preferably up to about 1:100 or 1:150. With too much flavour source, given this is generally in liquid/fat form, initiating combustion can be more difficult. Having insufficient flavour in the mixture makes the process less efficient and pushes the overall flavour towards a smoke flavour whereas preferred characteristics of the invention are predominantly of the grill-type.

Temperature

Generation of heat in the presence of oxygen (usually from air supplied to the combustion chamber) heats the mixture of smoke source and flavour source, leading to combustion of the flavour source. The method can be batch or continuous; in both, the mixture is typically heated from room temperature (25° C.) or ambient temperature to combustion temperature. Typically, the combustion temperature is above (e.g. at least 5 degrees above) that of the flash point of the flavour source. Preferably the temperature is also controlled so as not to reach 800 degrees C., more preferably not to reach 400 degrees C., though the heat should be high enough to burn the lipid and produce volatiles to be captured in the carrier. The minimum temperature is generally at least 200 degrees C., preferably at least 300 degrees C. Also preferably the temperature is 390 degrees C. or less, more preferably 380 degrees C. or less. In specific examples the temperature used was maintained in the range 320-380 degrees C. during flavour generation.

In particular embodiments of the invention, there are provided:

a method as described herein, wherein the combustion material comprises:
(1) 1-20 parts by weight smoke-free fuel, e.g. charcoal; and
(2) 20-1 part by weight smoke generating fuel, e.g. wood; and
(3) optionally, 2-30% by weight of the total of (1)+(2) filter material, a method as described herein wherein the mixture comprises from 1:10 to 1:150 flavour source:smoke source (combustion material) by weight, a method as described herein for making an oil-based food ingredient, comprising:
combusting at a temperature of from 200 to 380 degrees C., in the presence of oxygen, a mixture of (i) 5-150 parts by weight smoke source and (ii) 1 part by weight flavour source, to generate smoke; and
combining the smoke with an oil-based carrier, yielding the food ingredient, wherein the flavour source comprises a lipid having an oleic acid content (whether free or esterified) of 20% or higher, and a method as described herein, wherein the smoke source comprises a substantially homogenous mixture of wood dust:charcoal dust at a ratio of 1-3:3-1 and wherein the flavour source comprises sunflower oil or lard or tallow and the carrier comprises sunflower oil.

In specific embodiments of the invention there are provided methods as described herein for making oil-based food ingredients, comprising:
combusting a flavour source at a temperature of from 320 to 380 degrees C., in the presence of oxygen, in a substantially homogenous mixture of approximately (i) 1 part by weight charcoal dust and (ii) 1 part by weight wood dust, to generate smoke; and
combining the smoke with an oil-based carrier, yielding the food ingredient, wherein the flavour source comprises a lipid having an oleic acid content (whether free or esterified) of 20% or higher.

In further specific embodiments, illustrated in examples, the flavour source comprises sunflower oil or lard or tallow and the carrier comprises sunflower oil.

The invention further provides the food ingredients obtainable and obtained according to all methods of the invention.

Advantages

An advantage of the invention is that the products obtained are and may be classified as natural smoked products and foods/food ingredients. They are not artificial flavourings.

Identifiable and non-identifiable components of the non-volatile fraction of known grill flavours are almost entirely omitted from the ingredients made by the invention as a result of their manner of manufacture, namely by capturing volatile components from burning of the combustion material plus flavour source.

Processes of the invention are easily scalable and the processes are easily adaptable for different flavour source materials and different combinations of such materials. The processes allow capture of the new grill flavour in different media, e.g. water- and oil-based and also in foods such as salt, sugar etc. The processes are akin to smoking processes and can be used and adapted accordingly.

The processes may reduce PAH content in the end ingredient yet allow other optional minor flavour components to remain, making them safer and more commercially desirable. Furthermore, the processes allow other components to be included in the combusting mix, e.g. filters, which can even further enhance this effect.

The invention avoids the dangerous pyrolysis methods of the known methods for making "grill flavour".

The processes can produce, as evidenced in examples below, a savoury fatty flavour, with mild smokiness, described by some as better than grill flavour(s), and intended as a replacement for the known, and toxic, pyrolysis-derived grill flavours, for use in imparting grill flavour or grill-type flavour to foods.

The invention is now described in specific examples with reference to the accompanying drawings in which.

EXAMPLES

Example 1—Preparation of Flavoured Oil

A grill flavour was prepared by combustion of high oleic acid sunflower oil (smoke point—323° C., flash point—315° C., fire point—371° C.).

Materials

Charcoal dust (particle size up to approx. 1 mm)—4500 g

Oak sawdust—4500 g

Combustion oil (flavour source): High Oleic Sunflower Oil—180 g

Carrier oil: High Oleic Sunflower Oil—2 L

Apparatus

Figure 1:
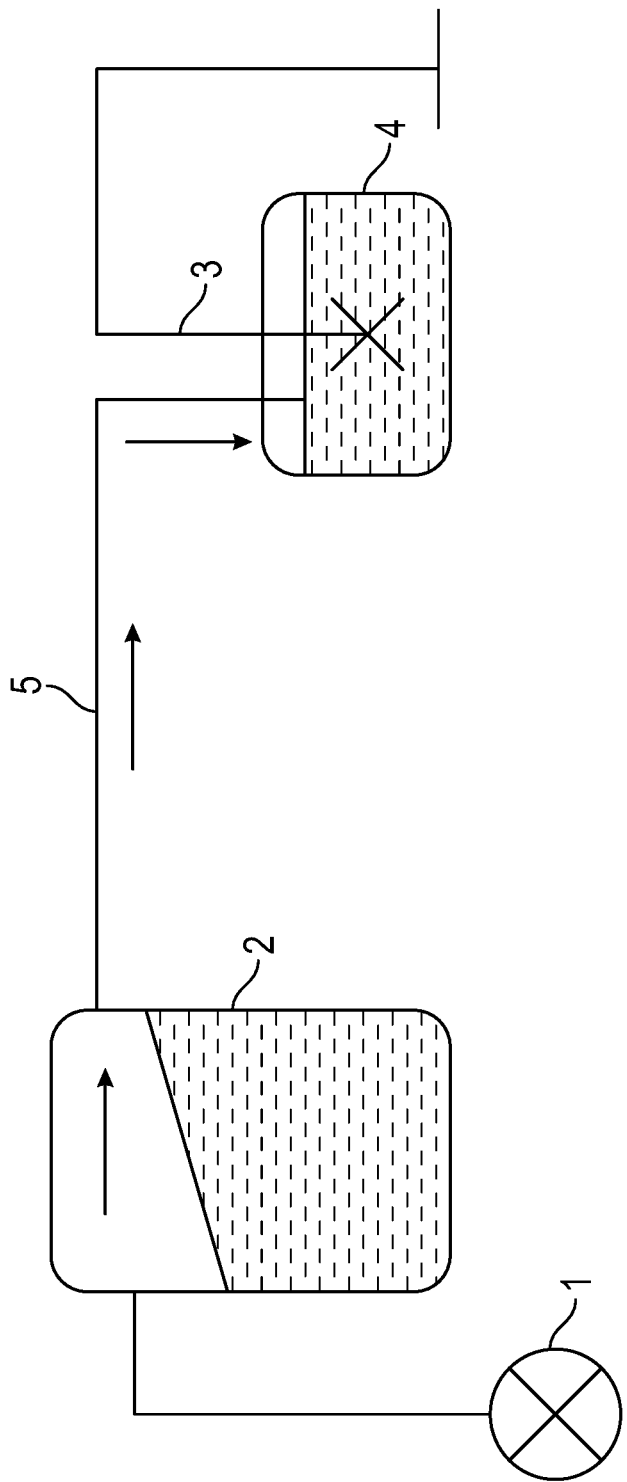
FIG. 1 shows a schematic diagram of apparatus for making flavoured oil.

Combustion apparatus, shown schematically in FIG. 1 was made up of a smoke furnace 2 into which air was pumped from fan 1. Smoke exiting the chamber passed via silicon tube 5 into mixing vessel 4 with continuous agitation by low-shear mixer 3.

Method

The 4500 g of charcoal and 4500 g of oak sawdust were weighed and mixed thoroughly to produce a homogenous blend. The blend was transferred into the smoke furnace. Two litres of high oleic sunflower oil were measured and transferred in the mixer vessel. The smoke furnace and the mixing vessel were connected using a silicon pipe. Afterwards, a small amount of hot ash was added to the wood-charcoal blend to start the smoking process. An air fan was connected to the furnace to control the air supply to the burning mix.

The air supply was regulated using a probe targeted at the centre of the combustion mass so that the temperature of the burning mix was maintained at about 320-380 degrees and did not reach 400° C. A total of 180 g of the same high oleic sunflower oil was added in small amounts, at regular intervals to the wood-charcoal blend during burning. The wood blend was stirred at regular intervals to promote the production of smoke. This agitation also helped to keep the temperature in the desired range, and to avoid it reaching 400° C.

The evolved smoke was continuously passed into carrier oil, with constant gentle mixing thereof, for 21 hours. The flavoured oil was tested and found to have a pleasant grill-type flavour. Testing for consumer reaction and comparison with known grill flavours is planned.

Example 2—Preparation of Flavoured Oil

A grill flavour was prepared by combustion of high oleic acid sunflower oil (smoke point—323° C., flash point—315° C., fire point—371° C.).

Materials

Charcoal dust (particle size up to approx. 1 mm)—4500 g

Oak sawdust—4500 g

Combustion oil (flavour source): High Oleic Sunflower Oil—180 g

Carrier oil: High Oleic Sunflower Oil—2 L

Apparatus

Combustion apparatus, shown schematically in FIG. 1 was made up of a smoke furnace 2 into which air was pumped from fan 1. Smoke exiting the chamber passed via silicon tube 5 into mixing vessel 4 with continuous agitation by low-shear mixer 3.

Method

The 4500 g of charcoal, 4500 g of oak sawdust and 180 g of combustion oil were weighed and mixed thoroughly to produce a homogenous blend. The blend was transferred into the smoke furnace. Two litres of high oleic sunflower oil were measured and transferred in the mixer vessel. The smoke furnace and the mixing vessel were connected using a silicon pipe. Afterwards, a small amount of hot ash was added to the wood-charcoal-oil blend to start the smoking process. An air fan was connected to the furnace to control the air supply to the burning mix.

The air supply was regulated using a probe targeted at the centre of the combustion mass so that the temperature of the burning mix was maintained at about 320-380 degrees and did not reach 400° C. The combustion mass was stirred at regular intervals to promote the production of smoke. This agitation also helped to keep the temperature in the desired range, and to avoid it reaching 400° C.

The evolved smoke was continuously passed into carrier oil, with constant gentle mixing thereof, for 21 hours. The flavoured oil was tested and found to have a pleasant grill-type flavour. Testing for consumer reaction and comparison with known grill flavours is planned.

Example 3—Preparation of Flavoured Oil

A grill flavour was prepared by combustion of beef dripping.

Materials

Charcoal dust (particle size up to approx. 1 mm)—4500 g

Oak sawdust—4500 g

Combustion oil (flavour source): Beef dripping—180 g

Carrier oil: High Oleic Sunflower Oil—2 L

Apparatus and Method

The procedure was repeated as for, and using the apparatus of, Examples 1 and 2 using the different combustion oil—in this case beef dripping.

After the same period of continuous smoking, the carrier oil was tested and also found to have a pleasant grill-type flavour. Similarly detailed testing of this oil is planned.

Example 4—Preparation of Flavoured Water

Figure 2:
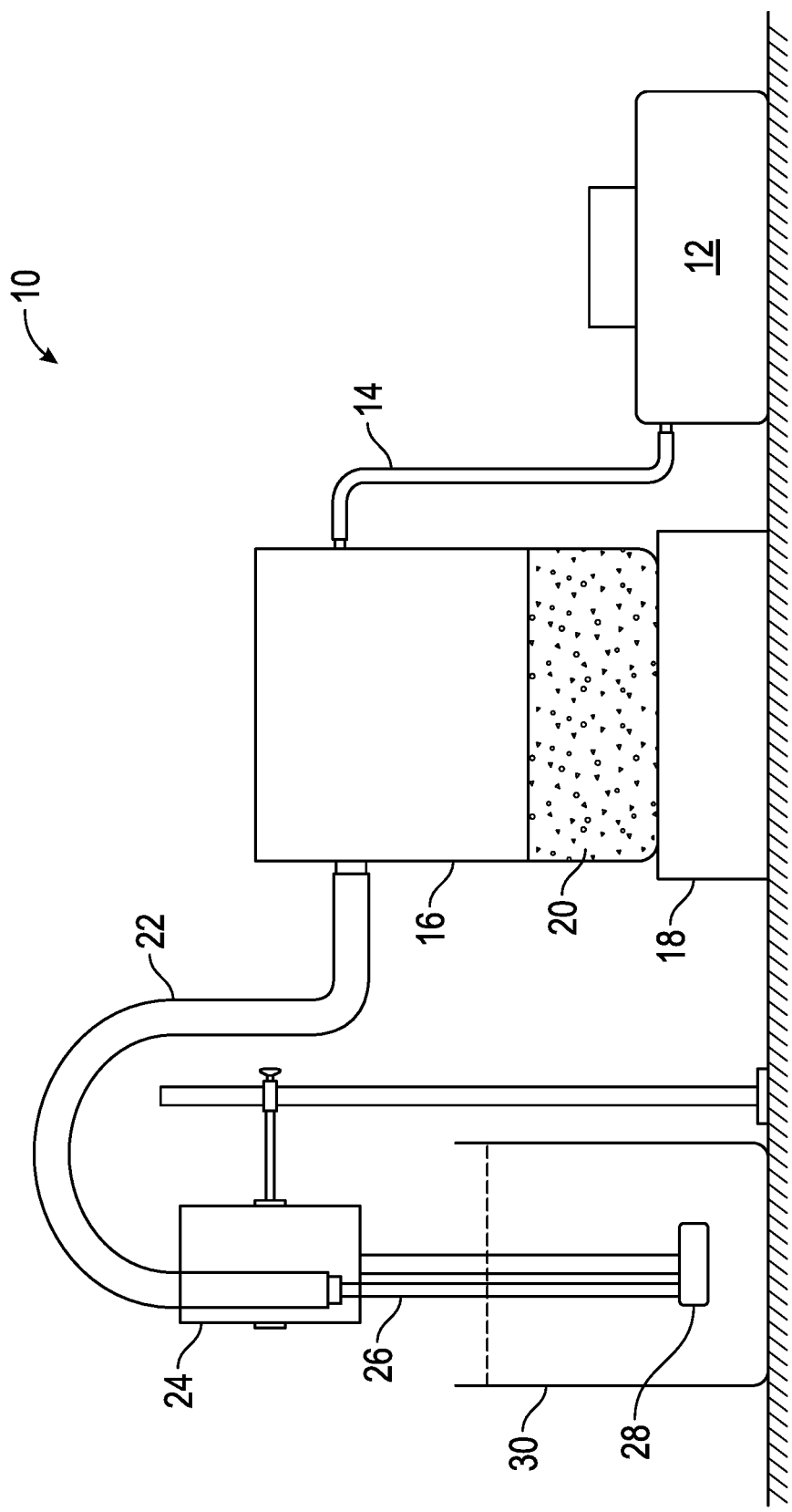
FIG. 2 shows a schematic diagram of apparatus for making flavoured water.

As shown schematically in FIG. 2, we used a water smoker 10 for preparation of flavoured water from oil and dripping (as per Examples 1 and 2 above).

A compressor 12 was linked by pipe 14 to airtight smoke chamber (approx. 100 litres) 16, containing combustible material 20 (4500 g oak dust plus 4500 g charcoal dust plus 900 g clinoptilolite and then 450 g sunflower oil (run 1) or beef dripping (run 2)).

The chamber smoke output was in turn linked to the stator portion of mixing head 28 of a YTRON® Y-ByPass mixer 24 via silicone rubber linking tube 22 and bypass pipe 26. The mixer is approximately 0.6 m tall with a power of 4.5 KW. The mixing head 28 is submerged during operation in water in a circular cross-section water pan (approx. 15 litres) 30.

Calibration had been carried out based on smoking of water with various mixtures of wood dust and clinoptilolite, as a result of which the apparatus was set with the parameters: air was flowed into the smoke chamber 16 at approximately 127 litres per minute. Combustion material was placed in the bottom of the chamber as a single batch and electrical heat source 18 was switched on to ignite the dust, producing smoke. The air flow directed smoke to the mixing head via the linking tube and the bypass pipe. The mixer was turned on and also exerted a low level of suction, thus drawing smoke down the bypass pipe and into the water in the pan. The bypass pipe exit was of diameter approx. 25 mm and was located approximately 6 mm above the spinning impellers (set to approx. 60 Hz) of the mixer inside the mixing head, delivering the chamber output smoke right into the centre of the mixing; as the impellers span the smoke was intimately homogenised into tiny bubbles at the centre of the mixing head, with frothing seen at and around the head and at the water surface. Tiny bubbles were also seen dispersed throughout the water, swirling in the mixed water, having long residence times before rising to the surface. The few bubbles of smoke passing through the solution escaped into the atmosphere directly.

Flavouring of the water was continued for 6 hours, to a pH of approx. 4 in the water and then the compressor and mixer switched off and the remaining dust left to extinguish by cutting off the air supply.

Both runs produced water with recognisable grill flavour qualities and comparable with industry-standard "grill flavour". In initial testing, some tasters described the ingredient as having a "savoury fatty flavour, with mild smokiness, better than grill flavour(s)".

PARTS LIST FOR APPARATUS 1 fan
2 smoke furnace
3 mixer
4 mixing vessel
5 silicon tube
10 water flavouring apparatus
12 compressor
14 connection pipe
16 smoking chamber
18 heat source
20 combustible material
22 connection tube
24 homogeniser
26 bypass pipe
28 mixing head
30 water pan Example 5—PAH Analysis A number of samples were smoked using the methods of the invention and, of these, four were sent away for PAH analysis at Eurofins Foods Testing UK Ltd.

The samples analysed for PAH content were given internal references "S0035", "S0048", "S0094" and "S0207". All four samples being smoked were high oleic sunflower oil, but each was smoked differently, as described below.

S0035 (comparative example) was smoked from a burning composition comprising 15% oak wood, 1% cherry wood, 15% beech wood, 59% charcoal and 5% clinoptilolite, with unrefined sunflower oil (5%) being dripped onto the burning mixture.

S0048 (comparative example) was smoked from a burning composition comprising 1% cherry wood, 15% mesquite wood, 15% beech wood, 59% charcoal and 5% clinoptilolite, with unrefined sunflower oil (5%) being dripped onto the burning mixture.

S0094 was smoked from a burning composition comprising 3.5% oak wood, 1% cherry wood, 3.5% mesquite wood, 77% charcoal, 10% clinoptilolite, and 5% unrefined sunflower oil intimately mixed with the other components prior to burning.

S0207 (comparative example) was smoked from a burning composition comprising 3.5% oak wood, 1% cherry wood, 3.5% mesquite wood, 77% charcoal and 10% clinoptilolite, with unrefined sunflower oil (5%) being dripped onto the burning mixture.

The smoking conditions, e.g. smoking temperature, smoking duration and smoking apparatus, were controlled for samples S0094 and S0207 so that the only difference between those two samples was the method of applying the unrefined sunflower oil, i.e. intimately mixing prior to combustion (S0094) or dripping/spraying during combustion (S0207).

The samples were then analysed for PAH content. Following European Commission Regulation 835/2011, the maximum acceptable level of PAHs in oils to be used as foodstuffs is 2.0 µg/kg for benzo(a)pyrene and 10 µg/kg for the sum of benzo(a)pyrene, benz(a)anthracene, benzo(b)fluoranthene and chrysene (sum of 4).

Table 1 provides the results of the PAH analysis:—

| Sample | Benzo(a)pyrene (µg/kg) | Sum of 4 (µg/kg) |
|---|---|---|
| S0035 | 4.8 | 39.5 |
| S0048 | 4.3 | 31.1 |
| S0094 | 1.1 | 9.9 |
| S0207 | 2.9 | 27.4 |

Levels of PAHs were significantly reduced by intimately mixing the flavour source, i.e. the unrefined sunflower oil, with the other components, i.e. the smoke source (in this case, various types of wood and charcoal) and the filter material (in this case, clinoptilolite), prior to combustion.

It is seen that S0094, as per the invention, met both criteria of Regulation 835/2011 and the three comparative examples (S0035, S0048 and S0207) failed both criteria.

The invention thus provides methods of preparing food ingredients, and the food ingredients thus produced.

The invention claimed is:

1. A method of making a food ingredient, comprising:
   providing a homogenous mixture of (i) smoke source and (ii) flavour source;
   combusting the homogenous mixture to generate smoke; and
   combining the smoke with a carrier, yielding the food ingredient,
   wherein the flavour source comprises a lipid.

2. The method of claim 1, wherein the smoke source is in finely divided, particulate form.

3. The method of claim 1, wherein the smoke source is in powdered form.

4. The method of claim 1, wherein the carrier is a liquid carrier.

5. The method of claim 1, wherein the carrier is an oil having a saturated fat content of 10% or above.

6. The method of claim 1, wherein the flavour source is a lipid that contains oleic acid.

7. The method of claim 6, wherein the lipid is selected from animal fats, and oils, wherein the animal fat is selected from pig fat, beef fat, mutton fat, bacon dripping, chicken fat, turkey fat, and mixtures thereof.

8. The method of claim 6, wherein the lipid is selected from olive oil, pecan oil, canola oil, peanut oil, macadamia oil, sunflower oil, grape seed oil, sea buckthorn oil, sesame oil, poppyseed oil, safflower oil, pumpkin seed oil, rice bran oil, almond oil, rapeseed oil, and mixtures thereof.

9. The method of claim 1 comprising combusting the mixture in the presence of oxygen.

10. The method of claim 1, wherein the smoke source comprises combustion material selected from:

(1) wood chips, wood dust, wood shavings, wood briquettes, logs, smoke-free solid fuel, charcoal, and charcoal briquettes; and
(2) mixtures of two or more of (1); and also comprises
(3) filter material that selectively reduces the PAH content of the smoke, by selectively removing therefrom one or more PAHs that contain 4 or more benzene rings.

11. The method of claim 10, wherein the combustion material comprises:
(1) 1-20 parts by weight of smoke-free fuel; and
(2) 20-1 part by weight of the smoke generating fuel; and
(3) 2-30% by weight of the total of (1)+(2) of filter material.

12. The method of claim 1 wherein the mixture comprises from 1:10 to 1:150 flavour source:smoke source by weight.

13. The method of claim 1 for making an oil-based food ingredient, comprising:
combusting at a temperature of from 200 to 380 degrees C., in the presence of oxygen, a mixture of (i) 5-150 parts by weight smoke source and (ii) 1 part by weight flavour source, to generate smoke; and
combining the smoke with an oil-based carrier, yielding the food ingredient, wherein the flavour source comprises a lipid having an oleic acid content (whether free or esterified) of 20% or higher.

14. The method of claim 13, wherein the smoke source comprises a substantially homogenous mixture of wood dust:charcoal dust at a ratio of 1-3:3-1 by weight and wherein the flavour source comprises sunflower oil or lard or tallow and the carrier comprises sunflower oil.

15. The method of claim 1, wherein:
the homogenous mixture further comprises a zeolite; the carrier is a liquid carrier; and
the lipid is an oil or a fat.

16. The method of claim 15, wherein the liquid carrier is an oil having a saturated fat content of 10% or above.

17. The method of claim 15, wherein the intimate homogenous mixture comprises:
(1) 1-20 parts by weight smoke-free fuel; and
(2) 20-1 part by weight of the smoke generating fuel; and
(3) 2-30% by weight of the total of (1)+(2) zeolite.

18. The method of claim 15, wherein the mixture comprises from 1:10 to 1:150 oil or fat:smoke-generating source by weight.

19. A method of making an oil-based food ingredient, comprising:
combusting at a temperature of from 200 to 380 degrees C., in the presence of oxygen, a mixture of (i) 5-150 parts by weight smoke-generating source and (ii) 1 part by weight oil or fat, to generate smoke; and
combining the smoke with an oil-based carrier, yielding the food ingredient, wherein the oil or fat comprises a lipid having an oleic acid content (whether free or esterified) of 20% or higher.

20. The method of claim 19, wherein the smoke-generating source comprises a substantially homogenous mixture of wood dust:charcoal dust at a ratio of 1-3:3-1 by weight and the carrier comprises sunflower oil.

* * * * *